C. S. FLOWER & C. F. GRAVES.

Car-Couplings.

No. 133,364.    Patented Nov. 26, 1872.

UNITED STATES PATENT OFFICE.

CLAYTON S. FLOWER, OF KICKAPOO CITY, KANSAS, AND CINCINNATUS F. GRAVES, OF HICKORY, IOWA.

IMPROVEMENT IN CAR-COUPLINGS.

Specification forming part of Letters Patent No. 133,364, dated November 26, 1872.

*To all whom it may concern:*

Figure 1:
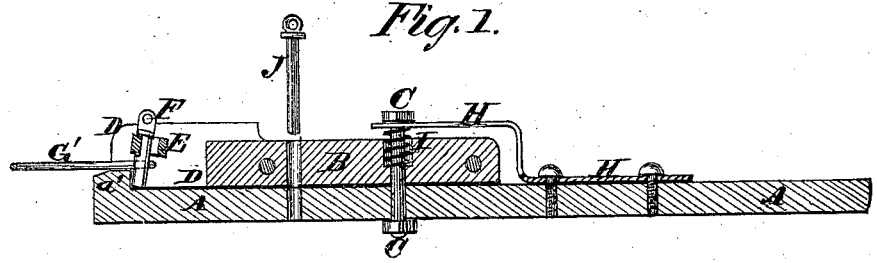
Figure 2:
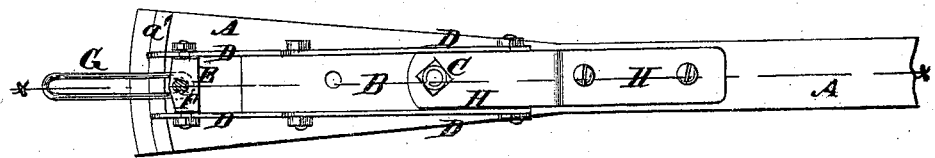

Be it known that we, CLAYTON S. FLOWER, of Kickapoo City, in the county of Leavenworth and State of Kansas, and CINCINNATUS F. GRAVES, of Hickory, in the county of Van Buren and State of Iowa, have invented a new and useful Improvement in Self-Detaching Car-Coupling, of which the following is a specification:

Figure 1 is a detail vertical longitudinal section of our improved car-coupling taken through the line *x x*, Fig. 2. Fig. 2 is a top view of the same.

Similar letters of reference indicate corresponding parts.

Our invention has for its object to furnish an improved car-coupling, which shall be so constructed that it will uncouple automatically should one or more cars get off the track, turn over, or drop down below the level of the other cars, and which shall, at the same time, be simple in construction, convenient in use, and safe and reliable in operation; and it consists in the construction and combination of the various parts, as hereinafter more fully described.

A represents the draw-bar, upon the forward end of which is formed the bumper-head, and which is attached to the car in the ordinary manner. The forward part of the bar or head A becomes gradually wider, and upon the upper side of its forward end is formed a strong upwardly-projecting flange, *a'*, for the lower end of the coupling-pin to rest against to sustain the draft, and which is made in the arc of a circle. B is a block, made of cast-iron, and which is pivoted, toward its rear end, to the bar A, by a bolt, C. The forward end of the block B does not extend quite to the flange *a'*, and to its side edges are bolted the bars or plates D, which are made of wrought-iron, and the forward ends of which extend forward to the flange *a'*, and are notched upon their lower edges to fit upon said flange. To and between the forward ends of the bars D is swiveled a bar, E, which is secured in place by nuts screwed upon the ends of its journals upon the outer sides of the said bars D. F is the coupling-pin, which is flattened in the direction of the draft, and is passed through a short transverse slot in the swiveled bar E, so that its forward or lower end may rest against the flange *a'* to sustain the draft. The forward edge of the upper part of the coupling-pin F is notched to receive the swiveled bar E, so that the said pin cannot rise out of the slot in the said swiveled bar E. By this construction should one or more of the cars get off the track or turn over the block B will swing around upon its pivoting-bolt C, and as soon as the end of the coupling-pin F has slipped from the end of the flange *a'* the swiveled bar E will turn, allowing the coupling-link G to slip from the coupling-pin F. H is a bar or plate, the rear part of which is securely bolted to the draw-bar A in the rear of the rear end of the block B. The bar or plate H is made with a bend or offset, so that its forward part may project above the rear part of the block B, said bend or offset being more than the thickness of the said block B, so that there may be a space between it and the upper side of the block B. The forward end of the bar or plate H has a hole formed through it for the passage of the bolt C. I is a coiled-wire spring, placed upon the bolt C, the upper end of which rests against the lower side of the bar or plate H, and its lower end rests in a recess formed in the upper side of the block B, as shown in Fig. 1. By this construction when the cars are in proper position upon the track the spring I holds the block B down upon the draw-bar A; but should one or more of the cars drop below the level of the other cars the forward end of the block B will be raised, compressing the spring I and raising the lower end of the coupling-pin F above the flange *a'*, allowing the swiveled bar E to turn and the coupling-link G to slip from the coupling-pin F. J is a pin, which may be passed down through a hole through the block B and bar A to prevent the said block B from turning upon its pivoting-bolt C. The pin J is only used when a car is off the track and it is desired to draw it back upon the track.

Having thus described our invention, we claim as new and desire to secure by Letters Patent—

1. The pivoted block B, side bars D, swiveled bar E, and coupling-pin F, constructed and operating in connection with the draw-bar A, having a flange, $a'$, formed upon the upper side of its forward end, substantially as herein shown and described, and for the purpose set forth.

2. The combination of the bar or plate H and coiled spring I with the draw-bar A, pivoted block B, side bars D, swiveled bar E, and coupling-pin F, substantially as herein shown and described, and for the purpose set forth.

CLAYTON SANFORD FLOWER.
CINCINNATUS F. GRAVES.

Witnesses:
JOHN BAKER,
P. W. HAUTTLY,
THOS. FARQUHAR,
D. K. KITTLE.